United States Patent [19] [11] 3,876,552
Moynihan [45] Apr. 8, 1975

[54] SOLAR ENERGY REFLECTING FILM STRUCTURE AND PROCESS OF MANUFACTURE THEREFOR

[75] Inventor: Robert Edward Moynihan, Lowell, Ohio

[73] Assignee: E. I. du Pont de Nemours and Company, Wilmington, Del.

[22] Filed: Mar. 16, 1972

[21] Appl. No.: 235,401

[52] U.S. Cl. ................. 161/5; 161/162; 260/42.22; 264/331; 252/300
[51] Int. Cl. ........................... F21v 9/00; C08f 45/04
[58] Field of Search ........ 260/41 B, 42.22; 252/300; 161/5

[56] References Cited

UNITED STATES PATENTS

| | | | |
|---|---|---|---|
| 2,947,646 | 8/1960 | Devaney et al. | 260/41 B |
| 3,069,301 | 12/1962 | Buckley | 154/2.77 |
| 3,276,943 | 10/1966 | Kawamura | 161/162 |
| 3,325,432 | 6/1967 | Kellert | 260/29.6 |
| 3,428,514 | 2/1969 | Greer et al. | 260/41 B |
| 3,503,919 | 3/1970 | Cadus | 260/37 |

*Primary Examiner*—Allan Lieberman
*Assistant Examiner*—J. H. Derrington

[57] ABSTRACT

An optically transparent and solar energy reflecting film structure is provided which is characterized by the presence therein of opaque metal platelets such as those of silver, gold, aluminum or copper. A process also is provided which includes blending opaque metal platelets with an organic polymeric material such as polyvinyl butyral and shaping the resulting blend into a film structure by extruding or compression molding means.

8 Claims, No Drawings

SOLAR ENERGY REFLECTING FILM STRUCTURE AND PROCESS OF MANUFACTURE THEREFOR

FIELD OF INVENTION

The present invention relates to an article of manufacture comprising a self-supporting film structure and to a method of manufacture therefor. More particularly, the present invention is directed to film structures of polyvinyl acetal which are optically transparent and possess a high degree of reflectivity of solar radiation and to a method of preparation therefor.

BACKGROUND OF INVENTION

Glazing structures which have the ability of excluding at least part of the solar energy incident thereupon have been recognized as being eminently desirable especially in architectural applications. For instance, large buildings especially those of multi-story construction often utilize large expanses of glazing material in the outer walls thereof for aesthetical as well as functional reasons. A major drawback associated with such building structures is that they are characterized by a high heat load due to the solar radiation incident upon the large expanses of the glazing material thereof; this is the so-called "greenhouse" or "hothouse" effect. Attempts to reduce the undesirable effects of solar radiation have included adding tinting or pigmenting agents to usually monolithic glazing material. The tinting technique utilizes an absorption mechanism to reduce the transmission of solar energy and, for this reason, it is of only limited success. Attempts to reduce solar energy transmission to a high degree by absorption results only in increasing the temperature of the glazing material so that much of the absorbed energy is still transmitted by or through the glazing material by convective and reradiative processes. Further efforts to avoid the greenhouse effect and circumvent the shortcomings of the tinting technique have included depositing a layer or film of reflective material on the exposed outer surface of the glazing material. Such layers have also been deposited on glazing material by vacuum metalizing techniques whereby a partially optically transparent film of metal is deposited directly on the one surface of a glazing structure which is destined to become the interior surface of a glazing unit. The principal disadvantage of this system is that the uniform deposition of partially reflective films over large areas is technically difficult and, as a result, glazing structures of this type are expensive and the use thereof has been limited. Accordingly, the principal object of the present invention is to provide an optically transparent film structure of polyvinyl acetal having a high degree of solar radiation reflectivity.

THE INVENTION

According to the present invention there is provided an article of manufacture comprising an optically transparent and solar energy reflecting film structure of polyvinyl acetal having dispersed therein opaque metal platelets. The opaque metal platelets of the film structure of the invention are characterized by a particle size or diameter of between about 5 microns and about 43 microns; preferably the metal platelets have a particle size of about 10 microns. The concentration of opaque metal platelets in the film structure of the invention may vary over a wide range; preferably the concentration of metal platelets in the film structure is selected so that the visible light transmission of the film structure is at least 8 percent. The opaque metal platelets dispersed in the film structure of the invention include platelets of aluminum, silver, gold, copper or copper bronze compositions. The film structure of the present invention may be of any suitable thickness as, for example, up to 75 mils thick.

Another embodiment of the present invention is a laminate structure comprising at least one layer of a light transmitting material such as glass having firmly adhered to at least one surface thereof an optically transparent and solar energy reflecting film structure of polyvinyl acetal having dispersed therein opaque metal platelets. An additional embodiment of the present invention is a laminate structure comprising two layers of a light transmitting material such as glass and an intermediate layer firmly adhered therebetween of an optically transparent and solar energy reflecting film structure of polyvinyl acetal having dispersed therein opaque metal platelets. At least one layer of said light transmitting material contains one or more light absorptive pigments, e.g., tinted glass.

Still another embodiment of the invention is a laminate structure comprising two layers of a suitable light transmitting material such as glass and an intermediate layer firmly adhered therebetween comprising a laminate structure having at least one layer of an optically transparent and solar energy reflecting film structure of polyvinyl acetal having dispersed therein opaque metal platelets and at least one layer of a film structure of organic polymeric material containing a light absorptive pigment.

According to the present invention, there is further provided a process of manufacture for making optically transparent and solar energy reflecting film structure which comprises blending opaque metal platelets with polyvinyl acetal resin material and shaping the resulting blend into a film structure at a temperature above the softening point of said polyvinyl acetal resin material thereby to obtain a monolithic film structure having opaque metal platelets dispersed therein. The shaping of the above described blend of opaque metal platelets and organic polymeric material is preferably accomplished by extrusion or compression molding techniques.

DETAILED DESCRIPTION

The nature and advantages of the film structure of the present invention will be more clearly understood by the following more detailed description thereof.

The present invention provides a film structure of polyvinyl acetal which is both optically transparent and solar energy reflecting. The film structures of polyvinyl acetal resins may be obtained by reacting polyvinyl alcohol with an aliphatic aldehyde. Because of the commercial importance of film structures of polymeric resins derived from polyvinyl alcohol and butyraldehyde, such polymeric resins constitute the most preferred material of the film structure of the invention, and the invention will be described and exemplified hereinafter with specific reference to film structures of polyvinyl butyral, hereinafter called PVB.

PVB, plasticizer additives for PVB and the shaping as by extrusion of PVB are more fully described in, for example, U.S. Pat. Nos. 2,864,784 and 2,829,399. Safety-glass glazing structures incorporating interlayers of PVB are more fully described in, for example, U.S. Pat.

Nos. 3,178,334; 3,434,915 and 3,231,461. PVB also ordinarily contains conventional additives such as, for example, UV light stabilizers or pigments.

An essential and necessary feature of the film structure of the invention is the presence therein of opaque metal platelets. These may, for example, be platelets of aluminum, silver, gold, copper or copper bronzes. The opaque metal platelets dispersed in the film structure of the invention may vary in particle size or diameter between about 5 microns and 43 microns. It has been discovered wholly unexpectedly and surprisingly that opaque metal platelets having a particle size or diameter as large as 43 microns provide satisfactory optical transparency in glazing structures utilized in typical architectural and nonwindshield vehicular uses. The appearance of glazing structures utilizing the film structure of the invention is significantly enhanced when opaque metal platelets having a diameter of about 10 microns are used in the film structure.

The amount of opaque metal platelets present in the film structure of the present invention may vary over a broad range, and satisfactory results have been obtained by using between about 0.01 and about 1 weight percent, based upon the total weight of the film structure, of opaque metal platelets. The concentration of the opaque metal platelets in the film structure ordinarily is selected to obtain a desired level of visible light transmission therethrough, and the maximum concentration should be selected so as to permit a visible light transmission through the film of at least about 8 percent. The preferred weight percent concentration of the opaque metal platelets in the film structure is between about 0.05 and about 0.50% in the case of aluminum platelets, and between about 0.10 and about 1.0% in the case of copper or silver platelets. These preferred concentrations of opaque metal platelets are used ordinarily with a film structure having a nominal 0.015 inch thickness. In film structures about one-half this thickness, e.g., about 0.008 inch, the preferred concentration would be approximately double the preferred concentration specified above. Likewise, in film structures about double the preferred nominal thickness, e.g., about 0.030 inch, the concentration of opaque metal platelets would be approximately half of the preferred concentration specified above.

The film structures of the invention have a diffuse reflectivity which is wavelength dependent and which can be correlated to the known wavelength dependent specular reflectivity of thick monolithic metallic films of the same metal as the platelets. Thus, opaque metal platelets may be selected to provide different reflectivity. For instance, aluminum platelets would be selected for obtaining uniform reflectivity over the entire range of the solar energy spectrum, whereas, metal platelets of copper or gold may be selected for obtaining more efficient reflection of the infrared portion of the solar energy spectrum.

A particularly useful embodiment of the present invention includes a laminate structure comprising at least one layer of glass or any suitable light transmitting material having firmly adhered to at least one surface thereof an optically transparent and solar energy reflecting film structure of PVB having dispersed therein opaque metal platelets. A very useful embodiment of the present invention is a laminate structure comprising two layers of a suitable light transmitting material such as glass and an intermediate layer firmly adhered therebetween of an optically transparent and solar energy reflecting film structure of PVB having dispersed therein opaque metal platelets. The intermediate layer in such laminate constructions may have any suitable thickness, and is preferably up to about 0.5 inch thick. In these embodiments, one layer of the light transmitting material may contain suitable absorptive pigments either alone or in admixture; a typical absorptive pigment is carbon black.

Another unique embodiment of the invention is a laminate structure comprising two layers of a suitable light transmitting material such as glass and an intermediate layer firmly adhered therebetween comprising a laminate structure having at least one layer of an optically transparent and solar energy reflecting film structure of PVB having dispersed therein opaque metal platelets and at least one layer of a film structure of organic polymeric material containing an absorptive pigment. Suitable absorptive pigments which may be present either alone or in admixture in the intermediate layer of the laminate structure include, for example, carbon black.

The amount of light absorptive pigment used in the pigmented layer of the intermediate laminate layer of the laminate structure is selected so as to permit a visible light transmission through the pigmented layer of less than about 70 percent. This embodiment of the invention is particularly useful in applications where it is desired to avoid image confusion but still permit optical transmission. For example, in architectural glazing applications and nonwindshield vehicular uses the incidence of outside light on the external surface of the glazing unit combined with the incidence simultaneously of interior light on the inside surface of the glazing unit accompanied by interior reflection causes image confusion. The above-described laminate structure utilizing a pigmented layer avoids image confusion when such laminate structures are utilized as glazing units having the pigmented layer oriented toward the interior of the building or vehicle.

Suitable light transmitting materials in the abovedescribed laminate structures include, for example, glass, polycarbonate, polymethylmethacrylate, etc., and similar materials.

The process provided by the present invention comprises blending opaque metal platelets with a polyvinyl acetal resin such as PVB and shaping the resulting blend into a film structure at a temperature above the softening point of said polyvinyl acetal resin. The shaping of the film structure is preferably achieved by extruding or compression molding the blend of polyvinyl acetal resin and opaque metal platelets in the conventional manner. It has been discovered that shaping the film structure by extrusion or compression molding techniques is particularly beneficial because such techniques orient the opaque metal platelets in the plane of the film structure thereby providing film structures of enhanced solar energy reflectivity.

Any convenient arrangement of suitable conventional apparatus may be employed to carry out the process. In typical practice the process is conducted as follows: particulate PVB is blended with opaque metal platelets of the proper particulate size in a suitable blending vessel. The PVB blend is then plasticized by adding a suitable plasticizer therefor and the resulting plasticized PVB blend is either extruded or compression molded into a film structure at about 175°C.

The principle and practice of the present invention will now be illustrated by the following Examples which are exemplary only and it is not intended that the invention be limited thereto since modifications in technique and operation will be apparent to anyone skilled in the art. All parts and percentages specified herein are by weight unless otherwise specified.

The test samples prepared in the following Examples were evaluated in accordance with the following test procedures: ASTM-E 179-66; ASTM-E 424-71 and ASTM-D 1003-61.

EXAMPLE 1

A. 0.72 Part of opaque silver platelets (Silflake 131; Handy and Hardman, New York, N. Y.) was blended with 100 parts of dry granular polyvinyl butyral resin. The mixture was plasticized with 44 parts triethylene glycol di-2-ethyl butyrate by milling at 120°C. under an inert atmosphere of nitrogen and pressed into film structures of 0.015 inch thickness. The pressed films were prepared by placing 12 grams of the milled PVB in the center of a chase having dimensions of 4.5 × 9 inches by 0.15 inch. The chase was placed in a hydraulic press and release sheets of polyester material were positioned above and below the chase. The chase was heated to 175°C. for 6 minutes while under contact pressure in the hydraulic press. Thereafter, a pressure of 1000 psi was applied to the chase for a period of 5 minutes, after which the chase was cooled under pressure.

A glazing structure consisting of two clear glass lites each of about ⅛ inch thickness having a sample of the film structure adhered therebetween when evaluated transmitted 57% and reflected 21% of the visible spectrum and transmitted 48% and reflected 19% of the solar energy spectrum. In typical viewer-glazing configurations, a good optical image was transmitted by the laminate.

B. The procedure in A above was repeated using opaque aluminum platelets of particle size between 10 and 20 microns in diameter (Aluminum Powder MD 2100, Alcan Metal Products Co.). The glazing structure when evaluated transmitted 24% and reflected 34% of the visible light spectrum and transmitted 22% and reflected 26% of the solar energy spectrum. The finer particle size was deemed to be an advantage as regards the visual appearance of the glazing structures.

EXAMPLE 2

0.15 Part of opaque aluminum platelets (Alcan Metal Products, MDV2100) passing through a 43 micron screen (325 Mesh, U.S. Screen Size) was blended with 100 parts of dry polyvinylbutyral flake. The mixture was plasticized with 44 parts of triethylene glycol di-2-ethylbutyrate and extruded into sheeting nominally 0.015 inch thickness. A glazing structure consisting of two clear lites of plate glass each of 0.125 inch thickness having a sample of the film structure adhered therebetween when evaluated transmitted 59% and reflected 21% of the visible spectrum and transmitted 50% and reflected 18% of the solar energy spectrum.

A glazing structure similar to that described immediately hereinabove except that the intermediate layer thereof was a laminar structure consisting of a layer of the abovedescribed PVB film structure bonded to a layer of 0.015 inch thick commercially available gray plasticized PVB film (Butacite B-10, carbon black pigmented) when evaluated by orienting the opaque aluminum-containing layer towards the light source transmitted 19% and reflected 19% of the visible spectrum and transmitted 19% and reflected 16% of the solar energy spectrum. This glazing structure had a particularly attractive appearance in typical viewer-glazing relationships.

A glazing structure was made by laminating together a sample of the PVB film structure described above between a lite of 0.09 inch thickness of clear glass and a lite of 0.125 inch thickness of gray heat absorbing glass (Parallelo Gray -LOF). The glazing structure upon evaluation, when oriented with the clear lite towards the radiation source, transmitted 30% and reflected 20% of the visible spectrum and transmitted 30% and reflected 20% of the solar energy spectrum. The glazing structure had a particularly attractive appearance in typical viewer-glazing relationships.

EXAMPLE 3

0.20 Part of the opaque aluminum platelets used in Example 2 predispersed in 44 parts of triethylene glycol di-2-ethylbutyrate and 100 parts of dry polyvinylbutyral flake were milled at 120°C. for 10 minutes and the product was compression molded into sheets of 0.015 inch thickness. A glazing structure consisting of two clear glass lites having a sample of the film structure adhered therebetween when evaluated transmitted 39% and reflected 31% of the visible spectrum and transmitted 33% and reflected 27% of the solar energy spectrum. This example illustrates that substantially equivalent results are obtained by this sequence of mixing which may be advantageous in some processes.

EXAMPLE 4

0.86 Part of opaque copper platelets (Druid Copper MD 150, Alcan Metal Products Co.) that passed through 43 micron screen (325 mesh, U.S. Screen Size) was blended with 100 parts of dry PVB flake. The blend was plasticized with 44 parts of triethylene glycol di-2-ethylbutyrate and extruded into film structures of about 0.015 inch thickness.

A glazing structure consisting of two clear lites of plate glass each of 0.125 inch thickness having a sample of the film structure adhered therebetween when evaluated transmitted 54% of the visible spectrum and transmitted 46% and reflected 16% of the solar energy spectrum.

What is claimed is:

1. An article of manufacture comprising an optically transparent and solar energy reflecting film structure of polyvinyl acetal resin having dispersed therein opaque metal platelets of a particle size between about 5 and about 43 microns wherein said opaque metal platelets are present in said film structure in an amount between about 0.005 and about 2% by weight, based upon the total weight of said film structure.

2. The article of claim 1 having a thickness of up to about 0.075 inch.

3. The article of claim 2 having a visible light transmission of at least about 8 percent.

4. The article of claim 3 wherein the opaque metal platelets are selected from the group consisting of silver, aluminum, gold, copper and copper bronze compositions.

5. The article of claim 1 wherein said polyvinyl acetal resin is polyvinyl butyral.

6. The article of claim 1 wherein said opaque metal platelets are present in said film structure in an amount between about 0.01 and about 1% by weight, based upon the total weight of said film structure.

7. A process of manufacture for making optically transparent and solar energy reflecting film structures which comprises blending opaque metal platelets of a particle size between about 5 and about 43 microns with a polyvinyl acetal resin material and shaping the resulting blend into a film structure at a temperature above the softening point of said polyvinyl acetal thereby to obtain a monolithic film structure having between about 0.005 and about 2% by weight of opaque metal platelets dispersed therein based upon the total weight of said film structure.

8. The process of claim 7 wherein said polyvinyl acetal resin is polyvinyl butyral.

* * * * *